US008973861B2

(12) United States Patent
Zhou et al.

(10) Patent No.: US 8,973,861 B2
(45) Date of Patent: Mar. 10, 2015

(54) TETRA-PROPELLER AIRCRAFT

(71) Applicant: Shenzhen Hubsan Technology Co., Ltd, Shenzhen (CN)

(72) Inventors: Qiangwu Zhou, Shenzhen (CN); Shidong Zhu, Shenzhen (CN); Guangyao Chen, Shenzhen (CN)

(73) Assignee: Shenzhen Hubsan Technology Co., Ltd., Shenzhen (CN)

( * ) Notice: Subject to any disclaimer, the term of this patent is extended or adjusted under 35 U.S.C. 154(b) by 148 days.

(21) Appl. No.: 13/672,795

(22) Filed: Nov. 9, 2012

(65) Prior Publication Data
US 2014/0117149 A1 May 1, 2014

(30) Foreign Application Priority Data

Oct. 29, 2012 (CN) .......................... 2012 1 0423957

(51) Int. Cl.
*B64C 27/08* (2006.01)
*A63H 27/00* (2006.01)
*B64C 27/20* (2006.01)
*B64C 39/02* (2006.01)

(52) U.S. Cl.
CPC ................ *A63H 27/12* (2013.01); *B64C 27/20* (2013.01); *B64C 39/024* (2013.01); *B64C 2201/027* (2013.01); *B64C 2201/108* (2013.01)
USPC .............................. 244/17.23; 446/37; 446/93

(58) Field of Classification Search
CPC ..................................................... B64C 39/024
USPC ............... 446/37, 38, 93, 94, 487; 244/17.23, 244/23 A, 17.27, 23 B, 23 C, 23 R, 124
See application file for complete search history.

(56) References Cited

U.S. PATENT DOCUMENTS

| | | | | |
|---|---|---|---|---|
| 4,132,028 A | * | 1/1979 | Ogawa | 446/94 |
| 4,895,542 A | * | 1/1990 | de Blanitza | 446/94 |
| 6,612,893 B2 | * | 9/2003 | Rehkemper et al. | 446/34 |
| 7,377,832 B2 | * | 5/2008 | Chamberlain | 446/57 |
| 8,322,648 B2 | * | 12/2012 | Kroetsch et al. | 244/17.23 |
| 8,774,982 B2 | * | 7/2014 | Oakley et al. | 701/2 |
| 2006/0226281 A1 | * | 10/2006 | Walton | 244/17.23 |
| 2009/0283629 A1 | * | 11/2009 | Kroetsch et al. | 244/17.23 |
| 2012/0056041 A1 | * | 3/2012 | Rhee et al. | 244/4 R |
| 2014/0099853 A1 | * | 4/2014 | Condon et al. | 446/37 |

FOREIGN PATENT DOCUMENTS

| | | | | |
|---|---|---|---|---|
| CN | 201565141 U | * | 9/2010 | A63H 27/133 |
| GB | 2455374 A | * | 6/2009 | B64C 39/02 |

OTHER PUBLICATIONS

"Hubsan H107 X4 2.4GHz 4CH 3D Mini Quad Copter RTF-free shipping." Retrieved from <http://9imod.com/index.php?main_page=product_info&cPath=119_335&products_id=626>. Oct. 26, 2010.*

* cited by examiner

*Primary Examiner* — Philip J Bonzell
*Assistant Examiner* — Michael Kreiner
(74) *Attorney, Agent, or Firm* — IPro, Inc.; Na Xu

(57) ABSTRACT

Described herein is a vertical take-off and landing aircraft comprising: an upper enclosure comprising a first upper arm and a second upper arm; a lower enclosure comprising a first lower arm and a second lower arm; wherein the first upper arm and the first lower arm comprise a first upper buckle and a first lower buckle, respectively; wherein the second upper arm and the second lower arm comprise a second upper buckle and a second lower buckle, respectively; wherein the first upper buckle engages the first lower buckle and the second upper buckle engages the second lower buckle, thereby securing the upper enclosure to the lower enclosure.

16 Claims, 6 Drawing Sheets

TETRA-PROPELLER AIRCRAFT

TECHNICAL FIELD

The disclosure herein relates to vertical take-off and landing (VTOL) aircrafts.

BACKGROUND

VTOL aircrafts such as helicopters found applications in both military and civilian markets. For example, a kind of VTOL aircrafts generally called tetra-propeller aircrafts are made for entertainment purposes. However, tetra-propeller aircrafts are by no means limited as toys or remotely controlled models. Tetra-propeller aircrafts may be used for survey, surveillance, aerial photography, etc.

Many existing tetra-propeller aircrafts comprise many components distributed through the aircrafts. Exemplary components include carbon fiber plates, carbon fiber rods, and aluminum alloy plates. These components usually have complex shapes. The number and the complex shapes of the components render these existing tetra-propeller aircrafts less crash-resistant, less deformation-resistant, less wind-resistant, less fatigue resistant, less agile, and/or less controllable (especially when performing complex maneuvers).

SUMMARY

Described herein is a vertical take-off and landing aircraft comprising: an upper enclosure comprising a first upper arm and a second upper arm; a lower enclosure comprising a first lower arm and a second lower arm; wherein the first upper arm and the first lower arm comprise a first upper buckle and a first lower buckle, respectively; wherein the second upper arm and the second lower arm comprise a second upper buckle and a second lower buckle, respectively; wherein the first upper buckle engages the first lower buckle and the second upper buckle engages the second lower buckle, thereby securing the upper enclosure to the lower enclosure.

DETAILED DESCRIPTION

Figure 1:
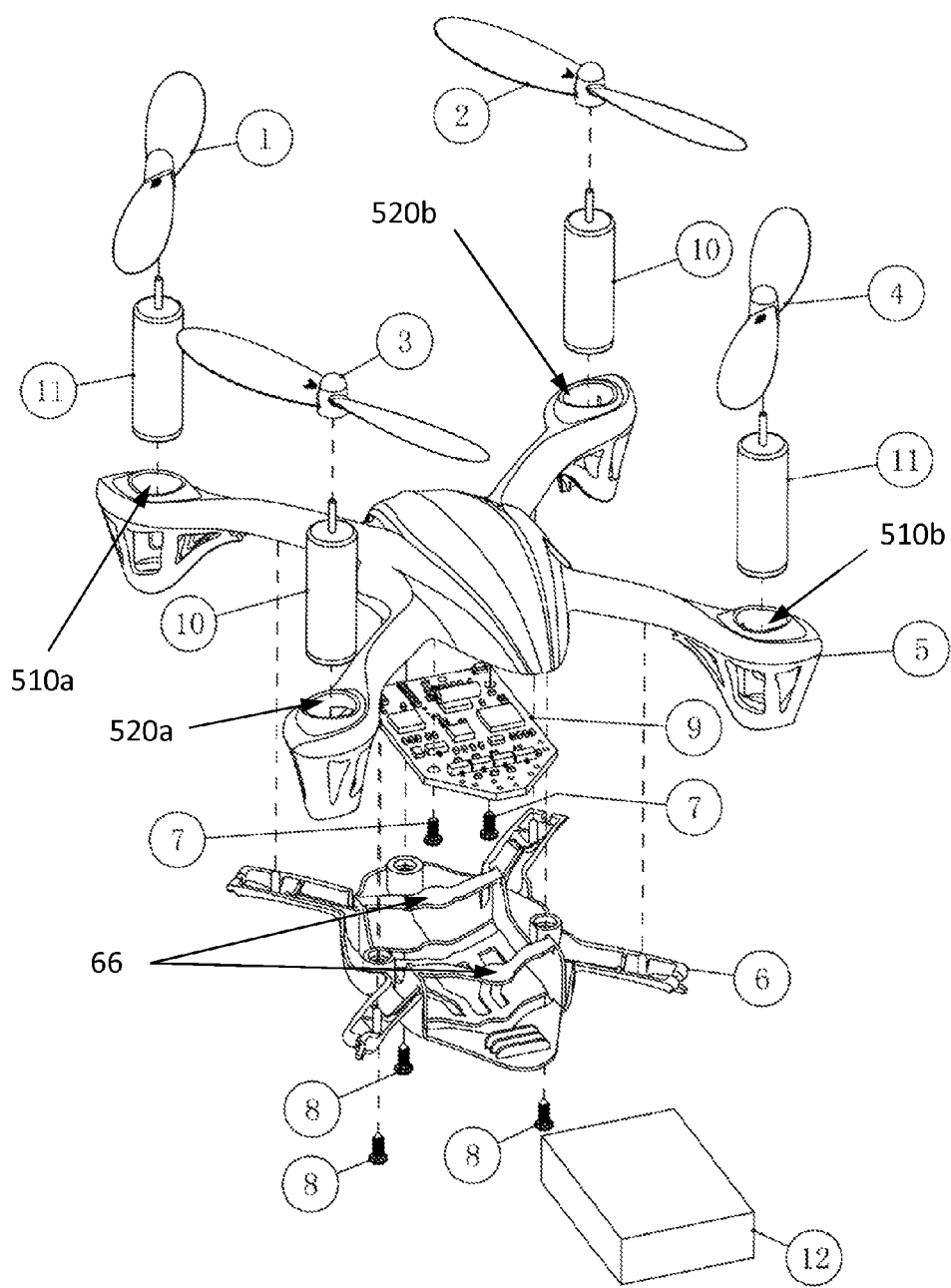
FIG. 1 shows an exploded view of a tetra-propeller aircraft according to an embodiment.

FIG. 1 shows an exploded view of a tetra-propeller aircraft according to an embodiment. The tetra-propeller aircraft comprises an upper enclosure 5, a lower enclosure 6, a PCB 9, one or more motors 10 and 11, a battery 12, four propellers 1, 2, 3, and 4. The tetra-propeller aircraft may further comprise one or more screws 8 and 7.

Figure 2A:
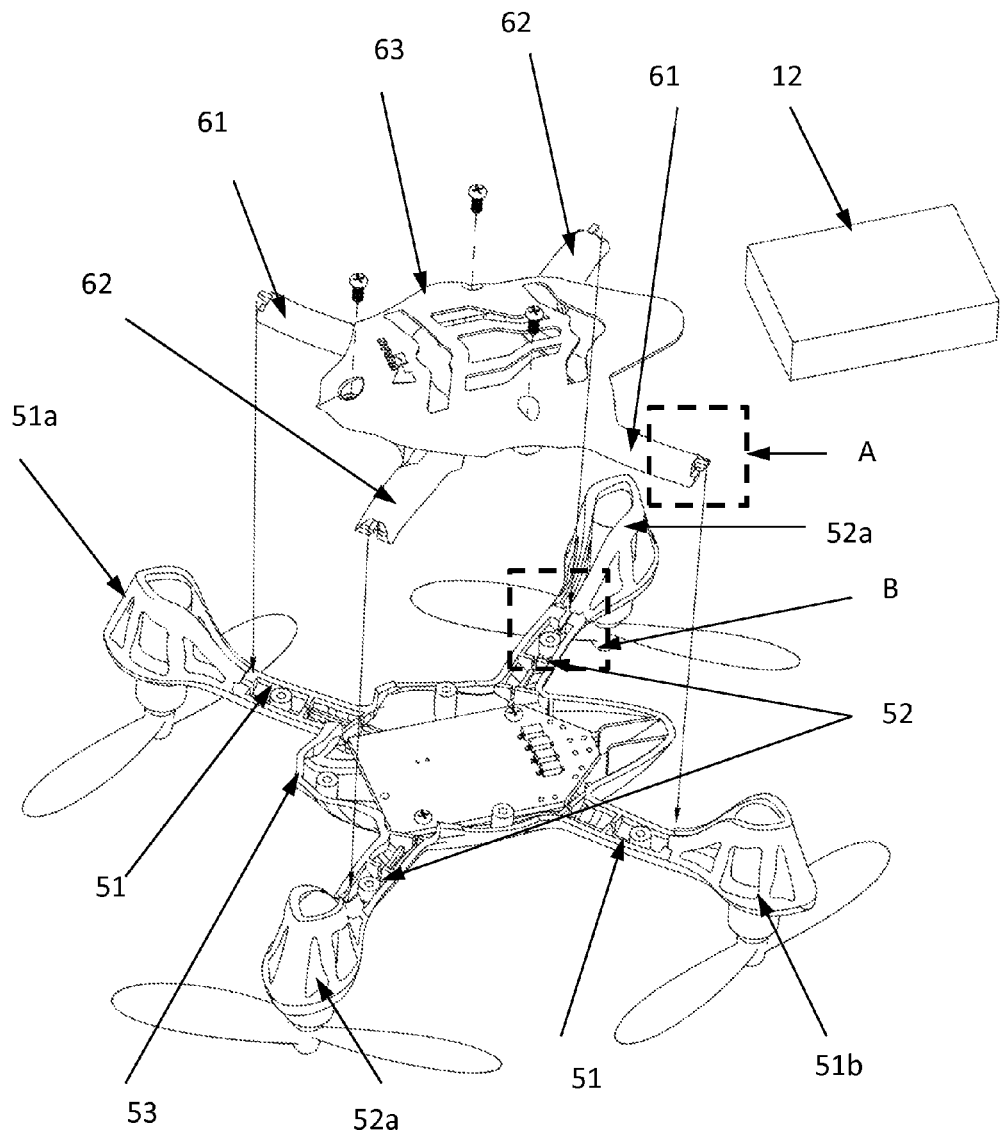
FIG. 2A shows another exploded view of the tetra-propeller aircraft.

FIG. 2A shows another exploded view of the tetra-propeller aircraft. As shown in FIGS. 1 and 2, the upper enclosure 5 has a first upper arm 51, a second upper arm 52 and a body 53. The first and second upper arms 51 and 52 are connected to the body 53 and the first and second upper arms 51 and 52 cross each other. At each end portions 51a and 51b, of the first upper arm 51, there may be a pocket 510a and 510b, respectively. The pockets 510a and 510b, are configured to accommodate the motors 11 therein or any transmission mechanism therein. At each end portions 52a and 52b, of the first arm 52, there may be a pocket 520a and 520b, respectively. The pockets 520a and 520b, are functional to accommodate the motors 10 therein or any transmission mechanism therein.

As shown in FIGS. 1 and 2A, the lower enclosure 6 also has a first lower arm 61, a second lower arm 62 and a body 63. The first lower arm 61 corresponds to the first upper arm 51 of the upper enclosure 5; the second lower arm 62 corresponds to the second upper arm 52. In an embodiment, the lower enclosure 6 comprises a battery holder 66, configured to removably secure the battery 12 on the lower enclosure 6.

Figure 2B:
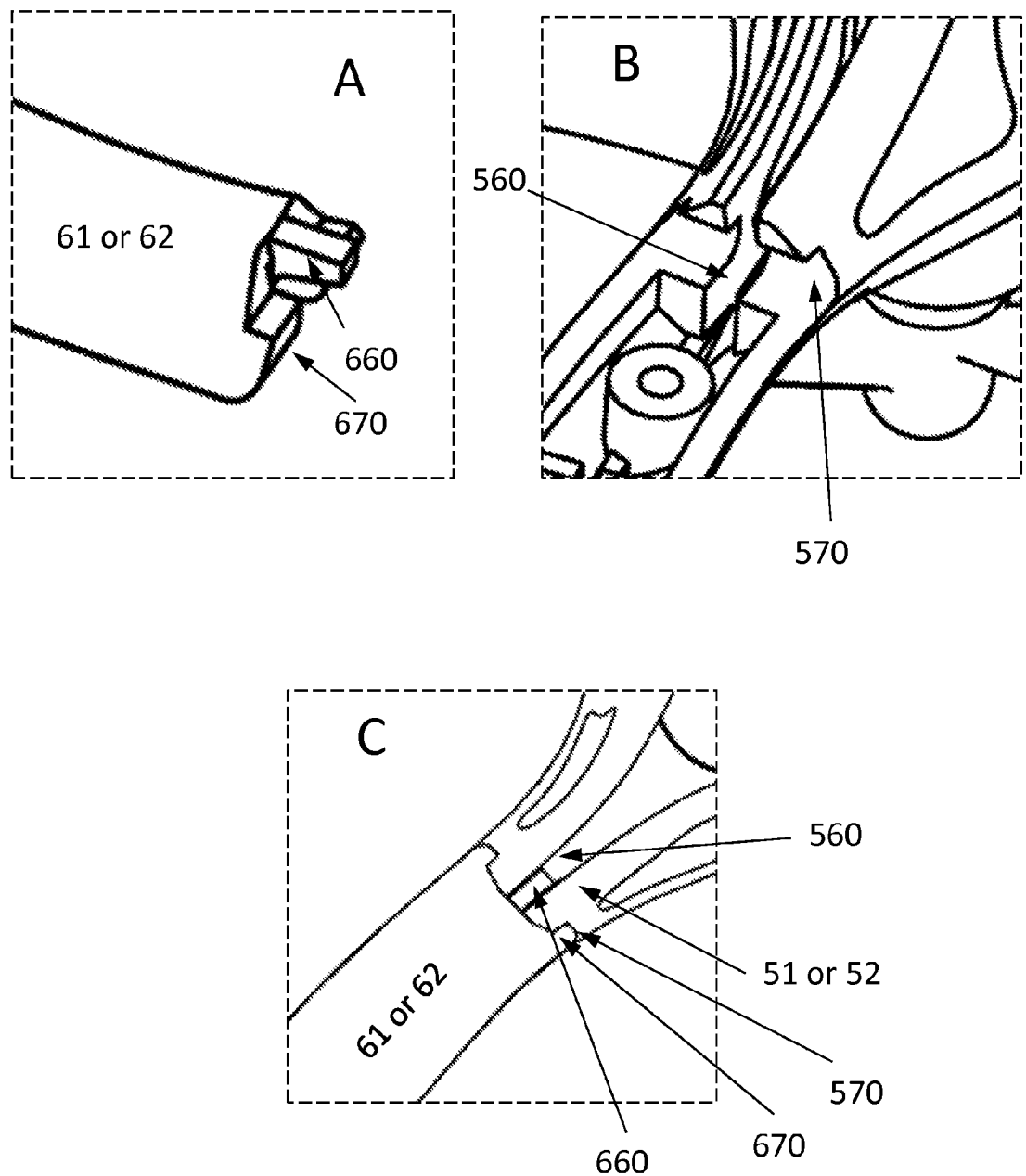
FIG. 2B shows details of the buckles on the enclosure of the tetra-propeller aircraft, according to an embodiment.

According to an embodiment, each end of the first and second lower arms 61 and 62, and each end of the first and second upper arms 51 and 52 comprise a buckle and are configured to engage one another when the upper enclosure 5 and the lower enclosure 6 are assembled. FIG. 2B shows details of the buckle according to an embodiment. Panel A in FIG. 2B corresponds to the dotted box A in FIG. 2A and shows details on the buckles on the arms 61 and 62. Panel B in FIG. 2B corresponds to the dotted box B in FIG. 2A and shows details on the buckle on the upper arms 51 and 52. The buckles on the lower arms 61 and 62 each comprise a protrusion 660. The protrusion 660 is narrower than the lower arms 61 and 62. The buckles on the lower arms 61 and 62 each comprise a step 670, displaced from the protrusion 660. The buckles on the arms 51 and 52 each comprise a slot 560 and a recess 570. The slot 560 is essentially of the same width as the protrusion 660. When the upper enclosure 5 and the lower enclosure 6 are assembled, the buckles on the lower arms 61 and 62 engage the buckles on the upper arms 51 and 52, thereby securing the upper enclosure 5 to the lower enclosure 6. Specifically, the protrusion 660 engages the slot 560 and the step 670 engages the recess 570. See Panel C of FIG. 2B. The upper enclosure 5 may be further secured to the lower enclosure 6 by screws 8.

The PCB 9 may be mounted to the upper enclosure 5 using any suitable method such as screws 7, clips, or adhesive. For example, the PCB 9 may be mounted under the body 53 of the upper enclosure 5. The PCB 9 may comprise any suitable components such as remote control transmittal module, antenna, micro-processor, memory, amplifiers, GPS receiver, altitude meter and camera. The PCB 9 may be configured to receive signals from satellite, remote controller; transmit signal to satellite, remote receiver; control location, speed, heading and trajectory of the aircraft; process image data; and drive motors 10 and 11. The PCB 9 may be powered by any suitable power source such as the battery or a solar panel 12.

Figure 4:
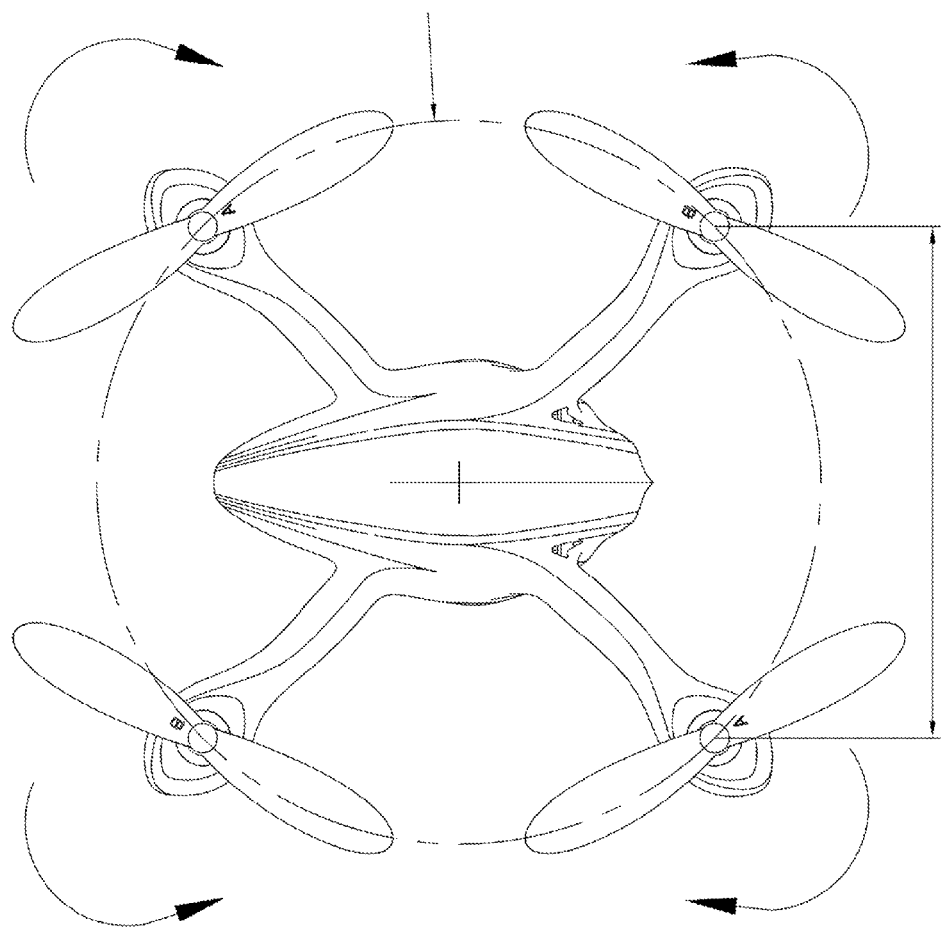
FIG. 4 shows rotation directions of motors and propellers of the tetra-propeller aircraft.

As shown in FIG. 4, the motors 10, mounted in the pockets 520a and 520b, are configured to rotate in the same direction. The motors 11, mounted in the pockets 510a and 510b, are configured to rotate in the same direction, but in opposite direction from that of the motors 10. Namely, the motors mounted to one arm of the upper enclosure 5 rotate clockwise and the motors mounted to the other arm of the upper enclosure 5 rotate counterclockwise, or vice versa. Axes of the motors 10 and 11 are parallel to each other and are located on a same cylindrical surface.

Propellers 2 and 3 are mounted to the motors 10 and propellers 1 and 4 are mounted to the motors 11. In an embodiment, propellers 2 and 3 have the same angle of attack as propeller 1 and 4. Because propellers 2 and 3 rotate in opposite direction from propeller 1 and 4, all propellers 1-4 produce lift when rotating, the blades on propellers 2 and 3 have opposite twist relative to their hubs. Propellers 2 and 3 may be viewed as a mirror image of propeller 1 and 4.

The battery 12 may be any suitable battery, such as a rechargeable lithium-ion battery.

Figure 3:
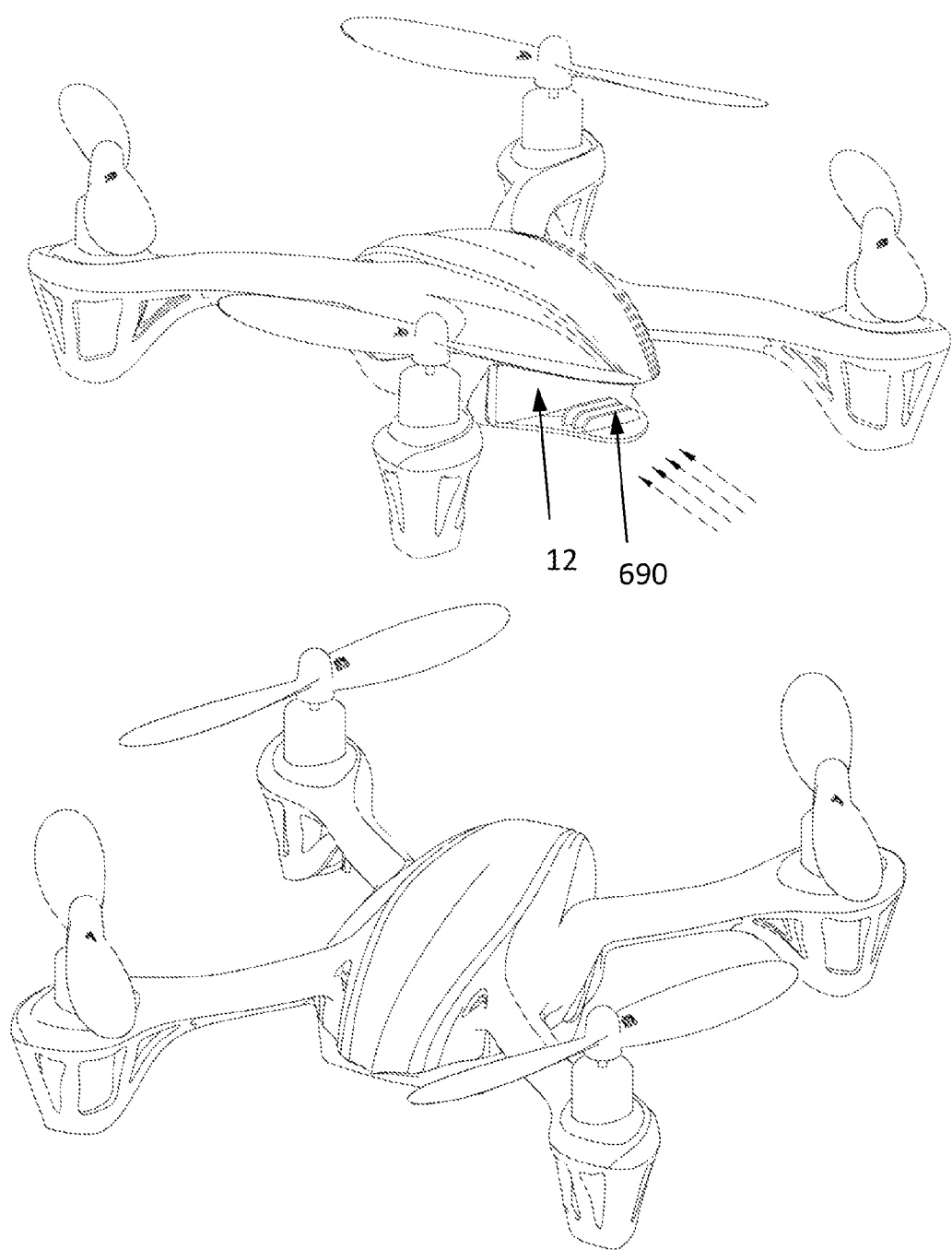
FIG. 3 shows insertion of a battery into the tetra-propeller aircraft.

As shown in FIG. 3, the lower enclosure 6 and the upper enclosure 5 are shaped such that when assembled, the battery 12 may be removably inserted into the battery holder 66 from a side of the aircraft (e.g., along the direction of the four parallel arrows in the upper panel of FIG. 3). The lower enclosure 6 or the upper enclosure 5 may comprise one or more ribs 690 configured to prevent accidental release of the battery 12 from the aircraft.

Figure 5:
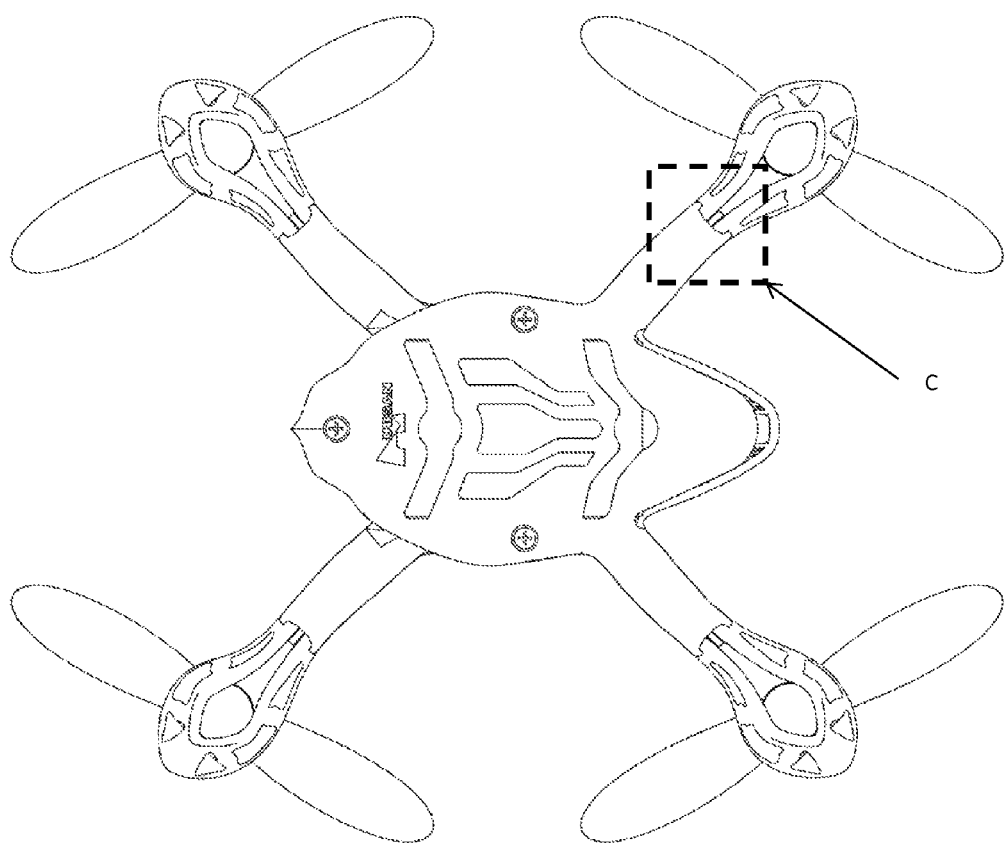
FIG. 5 shows a bottom view of the tetra-propeller aircraft.

FIG. 5 shows a bottom view of the aircraft. Details of the dotted area are shown in Panel C in FIG. 2B.

The tetra-propeller aircraft as described herein, according to one or more embodiments, is stable, wind-resistant, crash-resistant, agile, and controllable.

In relation to the claims, it is intended that when words such as "a," "an," "at least one," or "at least one portion" are used to preface a feature there is no intention to limit the claim to only one such feature unless specifically stated to the contrary in the claim.

The descriptions above are intended to be illustrative, not limiting. Thus, it will be apparent to one skilled in the art that modifications may be made without departing from the scope of the claims set out below.

What is claimed is:

1. A vertical take-off and landing aircraft comprising:
an upper enclosure comprising a first upper arm and a second upper arm;
a lower enclosure comprising a first lower arm and a second lower arm;
wherein the first upper arm and the first lower arm comprise a first upper buckle and a first lower buckle, respectively;
wherein the second upper arm and the second lower arm comprise a second upper buckle and a second lower buckle, respectively;
wherein the first upper buckle engages the first lower buckle and the second upper buckle engages the second lower buckle, thereby securing the upper enclosure to the lower enclosure;
wherein at least one of the first upper buckle and the second upper buckle comprises a slot and a recess; wherein at least one of the first lower buckle and the second lower buckle comprises a protrusion and a step; wherein the protrusion engages the slot and the stop engages the recess.

2. The vertical take-off and landing aircraft of claim 1, wherein the lower enclosure comprises a battery holder configured to removably secure a battery on the lower enclosure.

3. The vertical take-off and landing aircraft of claim 1, wherein the upper enclosure comprises a pocket at each end portion of the first upper arm and the second upper arm, the pocket being configured to accommodate one or more motors therein.

4. The vertical take-off and landing aircraft of claim 1, further comprising a PCB board configured to receive signals from a satellite or a remote controller; transmit signal to satellite, remote receiver; control location, speed, heading and trajectory of the vertical take-off and landing aircraft; process image data; drive motors; or a combination thereof.

5. The vertical take-off and landing aircraft of claim 4, wherein the PCB board is attached to the upper enclosure.

6. The vertical take-off and landing aircraft of claim 1, further comprising a solar panel.

7. The vertical take-off and landing aircraft of claim 1, further comprising two first motors mounted on the first upper arm and two second motors mounted on the second upper arm.

8. The vertical take-off and landing aircraft of claim 7, wherein the two first motors are configured to rotate clockwise and the two second motors are configured to rotate counterclockwise; or wherein the two first motors are configured to rotate counterclockwise and the two second motors are configured to rotate clockwise.

9. The vertical take-off and landing aircraft of claim 8, further comprising a propeller mounted on each of the first motors and each of the second motors.

10. The vertical take-off and landing aircraft of claim 9, wherein the propellers mounted on each of the first motors are mirror image of the propellers mounted on each of the second motors.

11. The vertical take-off and landing aircraft of claim 9, wherein the propellers produce lift when rotating.

12. The vertical take-off and landing aircraft of claim 7, wherein axes of the first motors and the second motors are parallel to each other and are located on a same cylindrical surface.

13. The vertical take-off and landing aircraft of claim 1, further comprising a battery.

14. The vertical take-off and landing aircraft of claim 13, wherein the battery is a rechargeable lithium-ion battery.

15. The vertical take-off and landing aircraft of claim 13, wherein the battery is configured to be removably inserted into the vertical take-off and landing aircraft from a side thereof.

16. The vertical take-off and landing aircraft of claim 13, wherein the lower enclosure further comprises one or more ribs configured to prevent accidental release of the battery from the vertical take-off and landing aircraft.

* * * * *